United States Patent
Chowdhary et al.

(10) Patent No.: US 11,750,634 B1
(45) Date of Patent: Sep. 5, 2023

(54) THREAT DETECTION MODEL DEVELOPMENT FOR NETWORK-BASED SYSTEMS

(71) Applicant: Amazon Technologies, Inc., Seattle, WA (US)

(72) Inventors: Ankush Chowdhary, Singapore (SG); Rohit Kailas Paygude, Singapore (SG)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 16/712,571

(22) Filed: Dec. 12, 2019

(51) Int. Cl.
  *H04L 9/00* (2022.01)
  *H04L 9/40* (2022.01)
  *G06N 20/00* (2019.01)

(52) U.S. Cl.
  CPC ......... *H04L 63/1433* (2013.01); *G06N 20/00* (2019.01); *H04L 63/1416* (2013.01); *H04L 63/20* (2013.01)

(58) Field of Classification Search
  CPC .. H04L 63/1433; H04L 63/1416; G06N 20/00
  USPC .......................................................... 726/25
  See application file for complete search history.

(56) References Cited

U.S. PATENT DOCUMENTS

| | | | |
|---|---|---|---|
| 7,996,201 B2 * | 8/2011 | Dowd | H04L 63/1433 703/13 |
| 9,178,902 B1 * | 11/2015 | Zagorsky | H04L 63/1416 |
| 11,108,790 B1 * | 8/2021 | Deardorff | G06F 21/53 |
| 2007/0169194 A1 * | 7/2007 | Church | G06F 21/554 726/23 |
| 2009/0319249 A1 * | 12/2009 | White | H04L 41/145 703/13 |
| 2016/0359915 A1 * | 12/2016 | Gupta | H04L 63/1416 |
| 2019/0342319 A1 * | 11/2019 | Luo | G06N 7/005 |
| 2020/0137115 A1 * | 4/2020 | Janakiraman | H04L 12/4633 |
| 2021/0273967 A1 * | 9/2021 | Vela | H04L 63/1466 |

\* cited by examiner

*Primary Examiner* — Christopher J Brown
(74) *Attorney, Agent, or Firm* — Lee & Hayes, P.C.

(57) ABSTRACT

This disclosure describes threat detection monitoring of systems executing in environments (consisting of hosts, networks, and/or applications, etc.), e.g., service provider networks, using trained deep learning/machine learning (ML) models. The models may be trained in one or more stages in simulators within a service provider network, e.g., the cloud, and/or in a simulator located in an on-premises environment, as well as on systems executing within the network. The models may be trained without relying on any security device/feature being configured or enabled, or with such security device/features being configured or enabled.

20 Claims, 10 Drawing Sheets

| SEVERITY 502 | FINDING TYPE 504 | INDICATOR 506 | TIME LAST SEEN 508 |
|---|---|---|---|
| MEDIUM | RECENTLY LINKED TO INTRUSION METHOD | MALICIOUS | 11-10-2019 06:22:54 |
| MEDIUM | HISTORICALLY REPORTED IN THREAT LIST | UNUSUAL | 11-10-2019 06:22:54 |
| MEDIUM | RECENTLY LINKED TO INTRUSION METHOD | MALICIOUS | 22-10-2019 07:49:51 |
| HIGH | NIST SEVERITY: CRITICAL | CRITICAL | 22-10-2019 07:49:51 |
| MEDIUM | HISTORICALLY REPORTED IN THREAT LIST | UNUSUAL | 22-10-2019 07:49:51 |
| HIGH | HISTORICALLY REPORTED IN THREAT LIST | UNUSUAL | 22-10-2019 07:49:51 |
| MEDIUM | NIST SEVERITY: HIGH | CRITICAL | 11-20-2019 06:22:54 |
| MEDIUM | RECENTLY RESOLVED TO UNUSUAL IP | N/A | 11-20-2019 06:22:54 |
| MEDIUM | RECENTLY LINKED TO INTRUSION METHOD | MALICIOUS | 22-10-2019 07:49:51 |
| MEDIUM | HISTORICALLY REPORTED IN THREAT LIST | UNUSUAL | 11-20-2019 06:22:54 |

THREAT DETECTION MODEL DEVELOPMENT FOR NETWORK-BASED SYSTEMS

BACKGROUND

Service providers offer cloud-based services via service provider networks to fulfill user's computing-service needs without the users having to invest in and maintain computing infrastructure required to implement the services. These service providers may provide network-based computing resources in a service provider network and functionality to implement various types of cloud-based services, such as, for example, scalable-storage services, computer-processing services, and so forth. In some examples, developers may utilize services offered by the service provider to run the applications using virtual services (or "instances") provisioned on various configurations of hardware-based resources of a cloud-based service.

Individuals and groups attempt to attack systems operating within the service provider networks. Such attacks are often referred to as cyberattacks and generally include any attempt to expose, alter, disable, destroy, steal, or gain unauthorized access to or make unauthorized use of an asset, e.g., the data and/or systems operating within a service provider network. In particular, the cyberattacks are generally any type of offensive maneuver that targets computer information systems, infrastructures, computer networks, or personal computer devices. The attacker generally attempts to access data, functions, or other restricted areas of the system without authorization and with malicious intent. Thus, the cyberattack may steal, alter, or destroy a specified target by hacking into a system, e.g., the service provider network. Accordingly, threat detection monitoring services are needed to monitor computing networks such as the service provider networks. However, there are numerous ways and techniques to launch such cyberattacks. Thus, monitoring for threat detection within computing networks may be resource intensive and may involve a large amount of manpower.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 schematically illustrates an example table of results of analyzing historical data using trained models.

DETAILED DESCRIPTION

Figure 1:
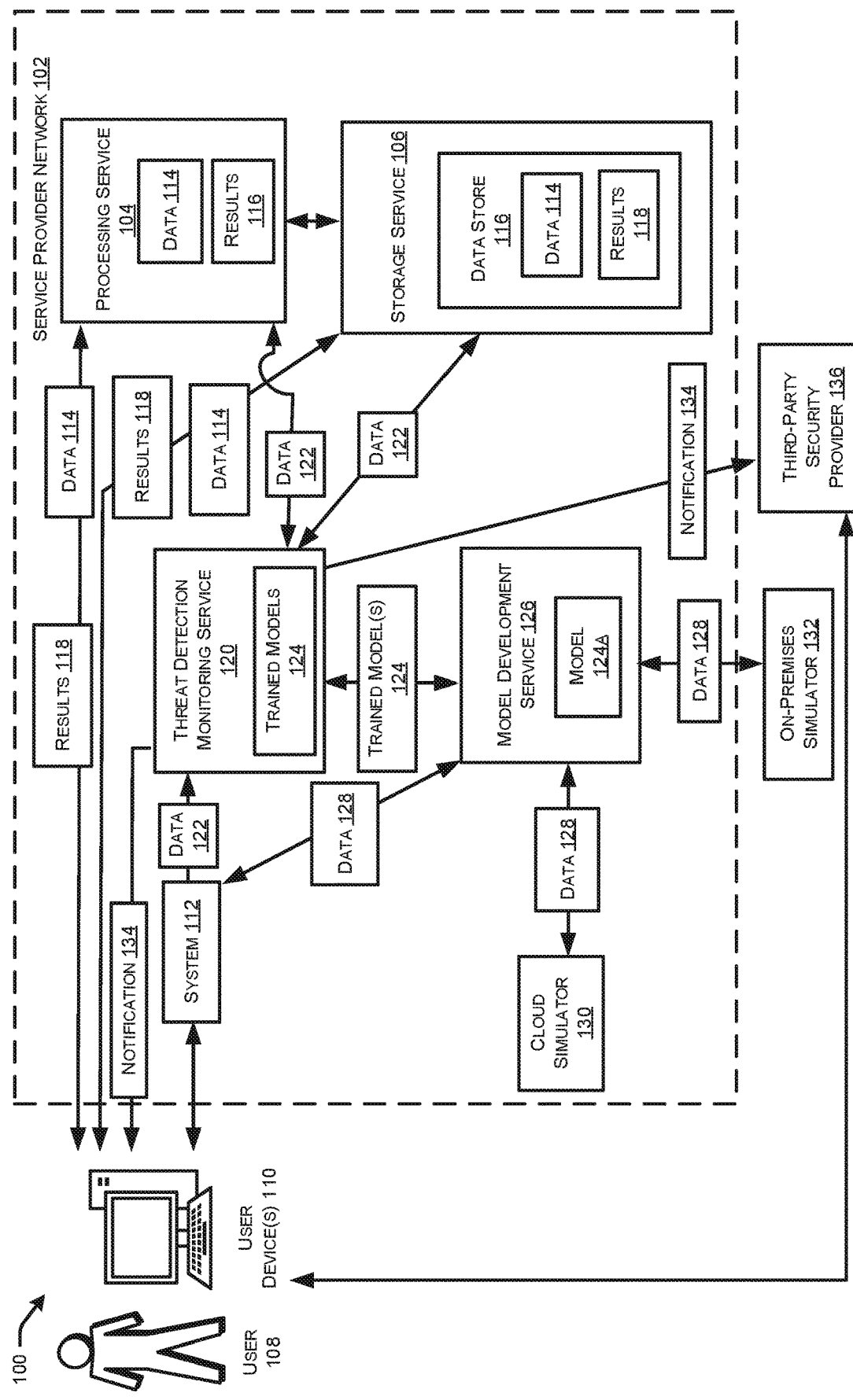
FIG. 1 schematically illustrates a system-architecture diagram of an example environment that includes a model development service that trains models for threat detection monitoring using one or more stages of simulated attacks in different simulated environments.

This disclosure describes, at least in part, techniques and architectures to monitor systems executing within an environment (consisting of hosts, networks, and/or applications), e.g., a service provider network, for various threats. The threat detection may be performed by using trained deep learning/machine learning (ML) models. The models may be trained in simulators within the service provider network, and in a simulator located on-premises environment, as well as on systems executing within the service provider network. The models may be trained without relying on any security device/feature configured or enabled or with such security device/features configured or enabled.

In particular, a model may be selected for a particular type of cyberattack. The type of cyberattack generally has different techniques that may be used to carry-out the attack. Examples of cyberattacks include, but are not limited to, privilege escalation, credential access, denial-of-service (DoS) and distributed denial-of-service (DDoS), man-in-the-middle (MitM), phishing and spear phishing, drive-by, password, SQL injection, cross-site scripting (XSS), eavesdropping, birthday, and malware. Thus, a model may be selected or developed and trained for a particular type of cyberattack, as well as a specific technique to carry-out the attack.

In configurations, a model may be developed for analyzing various pieces of data related to execution of systems, e.g., applications, within the service provider network. The data may relate to event data that provides indicators of a cyberattack (also referred to herein as "attack" or "threat") at different stages. The data collected and monitored includes, but is not limited to, host logs/events, net flows, and domain name system (DNS) logs from the live infrastructure of the service provider network.

For example, if the threat is privilege escalation, privilege escalation consists of techniques that adversaries use to gain higher-level permissions on a system or network. Adversaries can often enter and explore a network with unprivileged access but require elevated permissions to follow through on their objectives. Common approaches are to take advantage of system weaknesses, misconfigurations, and vulnerabilities. To detect privilege escalation host logs may be a primary form of data, which are security logs in an operating system such as Windows® and syslog in an operating system such as Linux®. There are multiple techniques for privilege escalation for which the data points are checked in the collected logs.

For example, in AppCert DLLs technique Dynamic-link libraries (DLLs) that are specified in the AppCertDLLs Registry key under HKEY_LOCAL_MACHINE\System\CurrentControlSet\Control\Session Manager are loaded into every process that calls the ubiquitously used application programming interface (API) functions CreateProcess, CreateProcessAsUser, CreateProcessWithLoginW, CreateProcessWithTokenW, or WinExec. This value can be abused to obtain persistence and Privilege Escalation by causing a malicious DLL to be loaded and run in the context of separate processes on the computer.

To detect the malicious DLL, the Application Events are searched for and DLL loads are monitored by processes, specifically looking for DLLs that are not recognized or not normally loaded into a process. The AppCertDLLs Registry value are monitored for modifications that do not correlate with known software, patch cycles, etc. The Windows Security Events are also examined for any flags generated by whitelisting tools, like Windows Defender Application Control, AppLocker, or Software Restriction Policies where appropriate.

In configurations, the deep learning model may comprise an architecture related to a recurrent neural network, for example, a long short-term memory (LSTM) neural network. LSTM is an artificial recurrent neural network (RNN) architecture used in the field of deep learning. Unlike standard feedforward neural networks, LSTM has feedback connections. It can not only process single data points (such as images), but also entire sequences of data. Another example architecture for the deep learning model includes using random cut forest (RCF), which is an unsupervised algorithm. Other architectures and algorithms may be used for the deep learning model if desired.

A system may be simulated within a simulator that may be executed within the service provider network. The particular type of attack and specific technique may then be simulated within the simulator and data may be gathered. The simulated attack is going to touch various pieces of hardware and/or software used to execute the system. Thus, while executing the simulated attack in the simulator, data may be gathered representing a trail within the simulated execution of the system. The data may include specific data and logs related to affected hardware devices, network devices, hosts, etc. The data may be related to emails, logs and flows that are generated across the trail of the attack.

In configurations, the simulator within the service provider network does not include simulated traffic, e.g., user, client, customer traffic, etc. Additionally, security controls are also not enabled or configured within the simulated system. In other configurations, the simulator within the service provider network does include simulated traffic, e.g., user, client, customer traffic, etc. Additionally, security controls may be enabled or configured within the simulated system.

Thus, using the data gathered from the simulated attack, a model for the specific type of attack and the specific technique may be trained. The model is informed that this data is based on an attack, in particular, the type of attack and the technique used. The data may include a time associated with the attack, a description of the attack, how the attack was executed, etc. Thus, the simulated attack generally represents a purposefully "infected" system executing within the service provider network. In configurations, the attack in the simulator may represent a "clean" attack with no noise present from traffic in the system (e.g., user traffic, client traffic, customer traffic, etc.) and security functions.

In configurations, a second stage of training the model may be implemented. In the second stage, a simulated attack may be performed on a simulated system or systems executing within a cyber range, e.g., an on-premises environment, as opposed to the first stage. The simulated attack in the cyber range may be performed as it was performed in the simulated cloud environment by simulating execution of a system or systems in the cyber range being attacked, or the simulation may be different. Data may be collected from the simulated attack and used to further train the model. Based on the data, the model learns the results/effects from the particular type of attack and specific technique used, as well as patterns from the particular type of attack and the specific technique used.

During the simulated attack in the cyber range, various amounts of traffic, e.g., user, client, customer traffic, etc., may be included in the simulation to thereby provide various levels of noise. Additionally, security features or controls may be enabled or configured during the simulation. In configurations, the simulation may be run with no security controls or features, and then the simulation may be run with security controls or features enabled. In configurations, the simulated attack may be performed within the security controls or features toggling between enabled and disabled.

The data gathered from the simulated attack in the cyber range may then be used to further train the model. Once again, the model is trained with the gathered data knowing the particular type of attack and the specific technique being used for the attack. Thus, as the model is being trained, the model learns the results/effects from the particular type of attack and specific technique used, as well as patterns from the particular type of attack and the specific technique used.

In configurations, a third stage of training of the model may be performed. A simulated attack may be performed on actual user systems executing within the service provider network. The simulated attacks may be performed at various times of the day, during various periods of traffic on the user systems, and with or without security controls or features being enabled. The data from the simulated attack may be collected and the model may be further trained using the gathered data from the third stage of the simulated attack.

Once the model has been trained, the trained model may be deployed within a threat detection monitoring service provided by the service provider network. The monitoring service may monitor systems executing within the service provider network for various threats using multiple trained models. The threat detection monitoring service may gather data from the various systems executing within the service provider network, as well as from the various services that the systems are utilizing for execution. For example, the service provider network may provide a processing service and a storage service. Systems executing within the service provider network may provide data to the processing service and/or the storage service. The processing service may instantiate one or more virtual machines (VMs) to process the data. The results of the data may be provided back to the user or may be stored within the storage service. Likewise, the processing service may process data retrieved from the storage service or provided directly by the user to the processing service. The threat detection monitoring service may thus monitor the system, the processing service, and the storage service, as well as the various hardware components network components, software components, etc., within the service provider network. Based upon the monitored data, e.g., host logs/events, net flows, DNS logs from the entire live infrastructure, e.g., the entire service provider network, a trained model with the threat detection monitoring service may detect an attempted attack. The model may determine a confidence level of the threat, e.g., eight out of ten, seven out of ten, etc., based upon the data. The threat detection monitoring service may then notify the user whose system is being threatened.

In configurations, the threat detection monitoring service incudes multiple trained models, with each model trained to identify a particular type of threat and a specific technique for instigating the particular type of threat. Thus, in configurations, the threat detection monitoring service may include hundreds of specific models for threat detection. The various models may communicate with each other thereby forming a neural network of trained models to monitor the network for various security threats and associated techniques for instigating the security threats. In configurations, one or more models may be trained to identify a particular type of threat and multiple techniques for instigating the particular type of threat.

As new types of threats and/or techniques are developed, the models may still detect the new threat and/or the new technique. For example, if a new technique for privilege escalation is attempted, one or more of the models trained for privilege escalation detection may detect that a privilege escalation attack is being attempted since even though it is a new technique, the monitored data may still show at least some of the effects on which the one or more models were trained. Thus, the one or more models may indicate that there is a potential privilege escalation threat, but only provide a five out of ten or six out of ten confidence level. Upon verification that a new technique for privilege escalation is occurring, models may be trained on the new technique and added to the models included within the threat detection monitoring service.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates a system-architecture diagram of an example environment 100 that includes an example service provider network 102. The service provider network 102 may comprise servers or hosts, applications, and/or networks (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network may be distributed across one or more physical or virtual devices.

As may be seen in FIG. 1, the service provider network 102 includes a processing service 104 and a storage service 106. In configurations, a user 108, which may be an individual, a group of individuals, an entity, an organization, a business entity, etc., may obtain or purchase services via one or more user device(s) 110, e.g., electronic devices, from an operator of the service provider network 102. For example, the user 108 may purchase services from the service provider network 102 that are used to execute a system 112 (and/or one or more applications) via the processing service 104. For example, the system 112 executed by the user 108 within the service provider network 102 may involve instantiation of one or more virtual machine instances (not illustrated) via the processing service 104. The user 108 may also, via execution of the system 112, store and retrieve data 114 from a data store 116 via the storage service 106.

When the system 112 is executing via the processing service 104, the processing service 104 may obtain the data 114 directly from the user device 110 and/or from the data store 116. The system 112 may store results 118 of the processing service 104 in the data store 116 (or another data store) provided by the storage service 106 and/or may provide the results 118 directly to the user device 110 of the user or another entity or service executing within the service provider network 102. The service provider network 102 may provide additional services for use in execution of the system 112 that are not illustrated in FIG. 1.

As may be seen in FIG. 1, the service provider network 102 includes a threat detection monitoring service 120. The threat detection monitoring service 120 monitors systems 112 executing within the service provider network 102, along with various services, e.g., processing service 104 and storage service 106, provided by the service provider network for users, e.g., user 108. Thus, the threat detection monitoring service 120 monitors various hardware components, network components, software components, etc., utilized by the service provider network 102 to provide the various services to users 108. For example, the threat detection monitoring service 120 collects data 122, including, but not limited to host logs/events, net flows, DNS logs, etc., from the entire infrastructure of the service provider network 102.

For example, if the threat is privilege escalation, privilege escalation consists of techniques that adversaries use to gain higher-level permissions on a system or network. Adversaries can often enter and explore a network with unprivileged access but require elevated permissions to follow through on their objectives. Common approaches are to take advantage of system weaknesses, misconfigurations, and vulnerabilities. To detect privilege escalation host logs may be a primary form of data 122, which are security logs in an operating system such as Windows® and syslog in an operating system such as Linux®. There are multiple techniques for privilege escalation for which the data points are checked in the collected logs.

For example, in AppCert DLLs technique Dynamic-link libraries (DLLs) that are specified in the AppCertDLLs Registry key under HKEY_LOCAL_MACHINE\System\CurrentControlSet\Control \Session Manager are loaded into every process that calls the ubiquitously used application programming interface (API) functions CreateProcess, CreateProcessAsUser, CreateProcessWithLoginW, CreateProcessWithTokenW, or WinExec. This value can be abused to obtain persistence and Privilege Escalation by causing a malicious DLL to be loaded and run in the context of separate processes on the computer.

To detect the malicious DLL, the Application Events are searched for and DLL loads are monitored by processes, specifically looking for DLLs that are not recognized or not normally loaded into a process. The AppCertDLLs Registry value are monitored for modifications that do not correlate with known software, patch cycles, etc. The Windows Security Events are also examined for any flags generated by whitelisting tools, like Windows Defender Application Control, AppLocker, or Software Restriction Policies where appropriate.

In configurations, the threat detection monitoring service 120 utilizes one or more trained models 124 to analyze the collected data 122. Based upon the collected data 122, the one or more models 124 may detect a threat with respect to the system 112 of the user 108 executing within the service provider network 112. In order to detect the threat, the trained models 124 are trained to recognize patterns and effects within the collected data 122 in order to detect the threat. In configurations, the trained models 124 may comprise deep learning/machine learning (ML) models comprising an architecture related to a recurrent neural network, for example, a long short-term memory (LSTM) neural network. LSTM is an artificial recurrent neural network (RNN) architecture used in the field of deep learning. Unlike standard feedforward neural networks, LSTM has feedback connections. It can not only process single data points (such as images), but also entire sequences of data. Another example architecture for the deep learning model includes using random cut forest (RCF), which is an unsupervised algorithm. Other architectures and algorithms may be used for the deep learning model if desired.

Thus, the service provider network 102 also includes a model development service 126. In configurations, the model development service 126 may be part of the threat detection monitoring service 120. The model development service 126 trains the trained models 124 using data 128 from simulated attacks, as will be described further herein. In configurations, the training of the trained models 124 is performed at various stages. A first stage of training includes running a simulated attack on a system executing on a cloud simulator 130 provided within the service provider network. The cloud simulator 130 may be instantiated by VMs to simulate systems executed by the service provider network 102. A simulated attack for a particular type of attack and a specific technique to carry out the attack is simulated by the cloud simulator 130 on the simulated systems. Data 128 from the simulated attack is collected from the cloud simulator 130 by the model development service 126 and then used to train a model 124a by providing the data 128 to the model 124a so that the model 124a can recognize patterns and effects within the data 128 in order to recognize the threat since the model knows that data 128 is related to the particular type of attack and specific technique for carrying out the attack.

In a second stage, a simulated attack is executed in an on-premises simulator 132. Thus, the on-premises simulator 132 is external to the service provider network 102 and includes various pieces of hardware and software utilized to execute a simulated system in a second simulated attack. The on-premises simulator 132 may comprise a collection of hardware computing components that may simulate systems similar to systems executed by the service provider network 102. A simulated attack for a particular type of attack and a specific technique to carry out the attack is simulated by the on-premises simulator 132 on the simulated systems. The data 128 from the simulated attack is collected by the model development service 126 and used to further train the model 124a for the particular type of attack and the specific technique for the particular attack so that the model 124a can further recognize patterns and effects within the data 128 in order to recognize the threat since the model knows that data 128 is related to the particular type of attack and specific technique for carrying out the attack.

In configurations, a third stage of training may include simulating an attack on the system 112 executing in the service provider network 102. The data 128 from the simulated attack on the system 112 may be collected and used by the model development service 126 to further train the model 124a. A simulated attack for a particular type of attack and a specific technique to carry out the attack is simulated by the model development service 126 on the system 112. The data 128 from the simulated attack is collected by the model development service 126 and used to further train the model 124a for the particular type of attack and the specific technique for the particular attack so that the model 124a can further recognize patterns and effects within the data 128 in order to recognize the threat since the model knows that data 128 is related to the particular type of attack and specific technique for carrying out the attack.

Once the model 124a has been trained, the model 124a may be deployed with other trained models 124 in the threat detection monitoring service 120 to monitor systems, e.g., system 112, executing in the service provider network 102, along with the overall infrastructure of the service provider network 102 for the particular type of threat and the specific type of technique for which the model 124a was trained. The threat detection monitoring service 120 collects and monitors data 122 related the system 112 executing in the service provider network 102. The data 122 includes, but is not limited to, host logs/events, net flows, and DNS logs from the live infrastructure of the service provider network. If one of the trained models 124 recognizes a pattern and/or effects in the data 122 based on the model's training, then a threat or attack may be detected.

If one of the trained models 124 detects a threat or an attack, the threat detection monitoring service 120 may provide a notification to the user 108 via the user device 110. In configurations, the user 108 may utilize a third-party security provider 136 that is not part of the service provider network 102. In such scenarios, if a trained model 124 detects a threat, then the threat detection monitoring service 120 may provide the notification 134 to the third-party security provider on behalf of the user 108. In configurations, the third-party security provider 136 may detect a threat on behalf of the user 108 and may request collected data 122 from the threat detection monitoring service 120 that has been collected from monitoring the system 112 on behalf of the user 108, as well as the data 122 collected from the overall infrastructure of the service provider network 102. The third-party security provider 134 may then track down the threat on behalf of the user 108 based upon the data 122 from the threat detection monitoring service 120.

Figure 2:
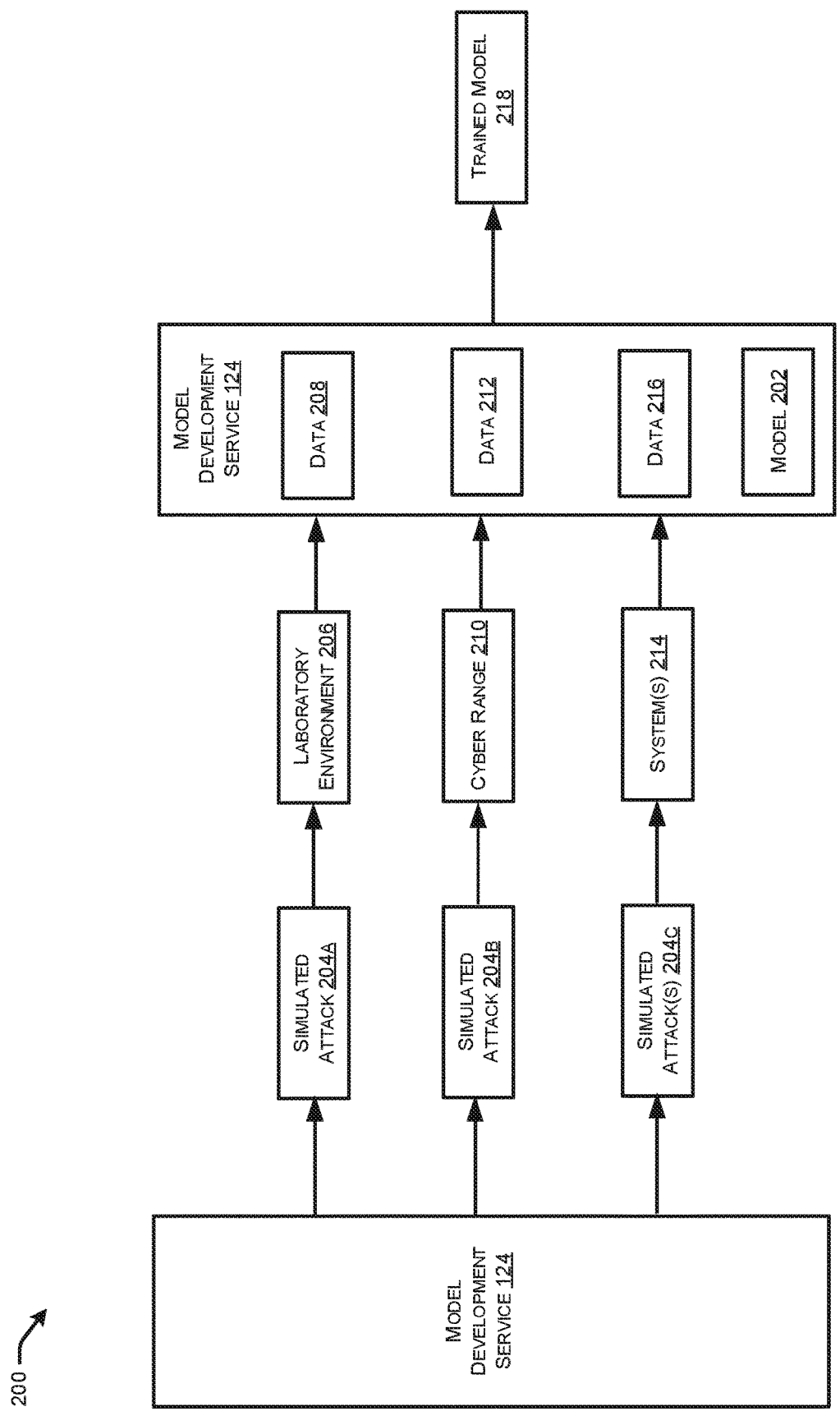
FIG. 2 schematically illustrates an example of an arrangement for training a model for detecting a particular threat based on a specific technique related to the particular threat using one or more of three stages.

FIG. 2 schematically illustrates an example of an arrangement 200 for training a model 202, e.g., model 124a, for detecting a particular threat based on a specific technique related to the particular threat using one or more of three stages. In a first stage, a first simulated attack 204a may be initiated by the model development service 126 and may be performed on a simulated system executing within a laboratory environment 206. In configurations, the laboratory environment 206 may be implemented within a service provider network, e.g., the cloud. The laboratory environment 206 may be instantiated by VMs to simulate systems executed by the service provider network 102. A simulated attack for a particular type of attack and a specific technique to carry out the attack is simulated by the laboratory environment 206 on the simulated systems. Thus, the laboratory simulator 206 may be at least similar to the cloud simulator 130 of FIG. 1. The model development service 126 may collect data 208 from the simulated attack within the laboratory environment 206. The collected data 208 may be utilized to train the model 202 within the model development service 126 by providing the data 208 to the model 202 so that the model 202 can recognize patterns and effects within the data 208 in order to recognize the threat since the model knows that data 208 is related to the particular type of attack and specific technique for carrying out the attack.

In configurations, the laboratory environment 206 does not include simulated traffic, e.g., user, client, customer traffic, etc., on the simulated system executing in the laboratory environment 206. In other configurations, the simulator within the service provider network does include simulated traffic, e.g., user, client, customer traffic, etc. Additionally, security controls and features may not be enabled or configured within the simulated system executing in the laboratory environment 206. However, in configurations, traffic and/or security controls and features may be included if desired.

Thus, using the data 208 collected from the first simulated attack 204a, the model 202 for the specific type of attack and the specific technique may be trained. The model 202 is informed that the data 208 is based on an attack, in particular, the type of attack and the technique used. The data 208 may include a time associated with the attack, a description of the attack, how the attack was executed, etc. Thus, the simulated attack 204a generally represents a purposefully "infected" system executing within the laboratory environment 206. The simulated attack 204a in the laboratory environment 206 may represent a "clean" attack with no noise present from traffic in the simulated system (e.g., user traffic, client traffic, customer traffic, etc.) and/or security functions. Based on the data 208, the model 202 learns the results/effects from the particular type of attack and specific technique used, as well as patterns from the particular type of attack and the specific technique used.

In a second stage, a second simulated attack 204b may be initiated by the model development service 126 and may be performed on a simulated system executing within a cyber range 210. The cyber range 210 may be implemented as an on-premises collection of computing and networking hardware, as well as software. The cyber range 210 may comprise a collection of hardware computing components that may simulate systems similar to systems executed by the service provider network 102. Thus, the cyber range 210 may be at least similar to the on-premises simulator 132 of FIG. 1. The model development service 126 may collect data 212 from the simulated attack within the cyber range 210. The collected data 212 may be utilized to further train the model 202 within the model development service 126 by providing the data 212 to the model 202 so that the model 202 can recognize patterns and effects within the data 212 in order to recognize the threat since the model knows that data 212 is related to the particular type of attack and specific technique for carrying out the attack.

In configurations, during the simulated attack 204b in the cyber range 210, various amounts of traffic, e.g., user, client, customer traffic, etc., may be included in the simulation to thereby provide various levels of noise. Additionally, security features or controls may be enabled or configured during the simulation. In configurations, the simulation may be run with no security controls or features, and then the simulation may be run with security controls or features enabled. In configurations, the simulated attack may be performed with the security controls or features toggling between enabled and disabled. Based on the data 212, the model 202 learns the results/effects from the particular type of attack and specific technique used, as well as patterns from the particular type of attack and the specific technique used, including the traffic and the enablement/disablement of the security features and controls.

In a third stage, one or more third simulated attacks 204c may be initiated by the model development service 126 and may be performed on one or more actual systems 214 executing within a network, e.g., one or more systems 112 executing within service provider network 102. The simulated attack(s) 204c may be performed at various times of the day, during various periods of traffic on the actual system(s) 214, and with or without security controls or features being enabled. The model development service 126 may collect data 216 from the simulated attack(s) on system(s) 214. The collected data 216 may be utilized to further train the model 202 within the model development service 126 by providing the data 216 to the model 202 so that the model 202 can recognize patterns and effects within the data 216 in order to recognize the threat since the model knows that data 216 is related to the particular type of attack and specific technique for carrying out the attack to provide a trained model 218.

In configurations, only one stage may be used to train the model 202 if desired. Additionally, only two of the three stages may be used to train the model 202 if desired. Also, in configurations, one or more models 202 may be trained to identify a particular type of threat and multiple techniques for instigating the particular type of threat.

Figure 3:
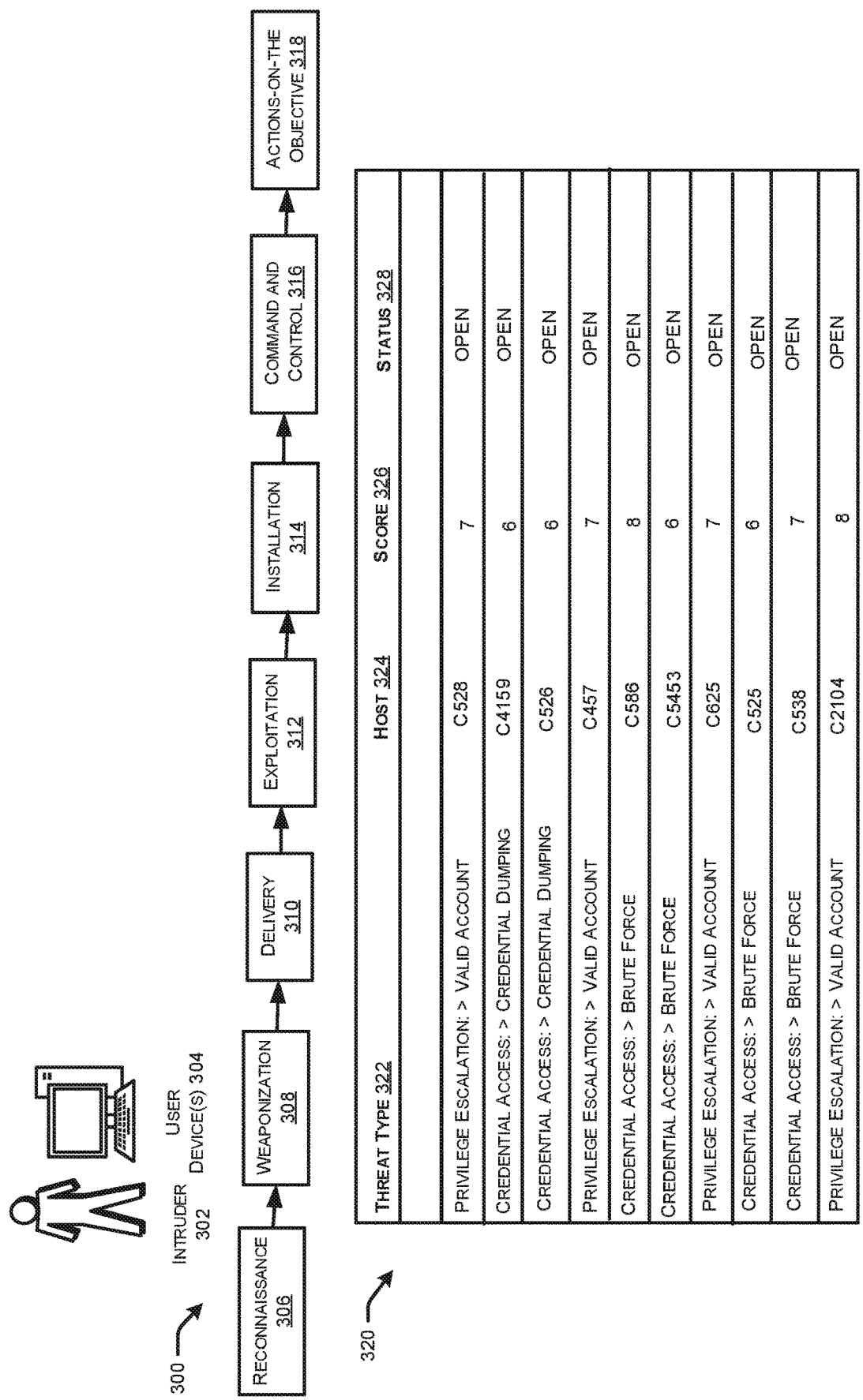
FIG. 3 schematically illustrates a timeline for an attack by an intruder using one or more user devices to attack a system or systems executing within a service provider network.

FIG. 3 schematically illustrates a timeline 300 for an attack by an intruder 302 using one or more user devices 304 to attack a system or systems, e.g., system 112, executing within a service provider network, e.g., service provider network 102. Generally, the attack progresses through several phases. The first phase 306 includes reconnaissance. During the reconnaissance phase 306, the intruder 302 may select a target, e.g., system 112. The intruder 302 researches the target and attempts to identify vulnerabilities, e.g., access to the target network, in the target network, e.g., the system 112 executing within the service provider network 102. During a second phase 308, referred to as weaponization 308, the intruder 302 may create a remote access weapon in the form of software intentionally designed to cause damage to a computer, server, client, or computer network, e.g., malware. The malware weapon may be in the form of, for example, a virus, or a worm. The virus or the worm may be tailored to one or more vulnerabilities that were identified during the reconnaissance phase 306.

During a third phase 310, referred to as the delivery phase 310, the intruder 302 transmits the weapon to the target using the one or more electronic devices 304. For example, the intruder 302 may transmit the weapon to the user device 110 of FIG. 1 via an email attachment, via access by the user device 110 to a website hosted by the one or more electronic devices 304, or by attachment of a USB drive (not illustrated) to the user device 110.

During an exploitation phase 312, the program code of the malware weapon triggers. The program code takes action on the target system, e.g., system 112, to exploit the vulnerability identified during the reconnaissance phase 306. During an installation phase 314, the malware weapon installs an access point. The access point provides a "back door" that is usable by the intruder 302 to access the target, e.g., system 112.

During a command and control phase 316, the malware enables the intruder to have "hands on the keyboard" persistent access to the target network. In other words, the intruder may work within the target network, e.g., system 112, directly as if the intruder were using the user's user device 110.

Finally, in an actions-on-the-objective phase 318, the intruder 302 takes action to achieve their desired goals. Such desired goals may include, for example, data exfiltration, data destruction, or encryption of data for ransom. For example, once the intruder 302 has completed the attack and now has access to the target, e.g., system 112, the intruder 302 may access data 114 and/or results 118 stored in the data store 116 of the storage service 106 of FIG. 1 and extract the data 114 and/or results 118, destroy the data 114 and/or results 118, or encrypt the data 114 and/or results 118 to extract a ransom from the user 108. Additionally, the intruder 302 may take action with respect to other services provided to the user 108 by the service provider network 102.

FIG. 3 also illustrates an example dashboard 320 associated with an attack timeline. The dashboard 320 illustrates examples of potential threats and techniques at 322 that have been detected by the threat detection monitoring service 120 of FIG. 1. For example, a first entry indicates a privilege escalation threat wherein a valid account has been identified and an intruder is attempting to escalate privileges for access to the account. The dashboard indicates at 324 a host on which the account is hosted and which the intruder is attempting to escalate privileges for access to the account. A threat score is provided at 326 and an indication is provided at 328 that the threat detection is currently open. In configurations, the threat score may represent a confidence level on a scale of one to ten that a potential threat exists.

Figure 4:
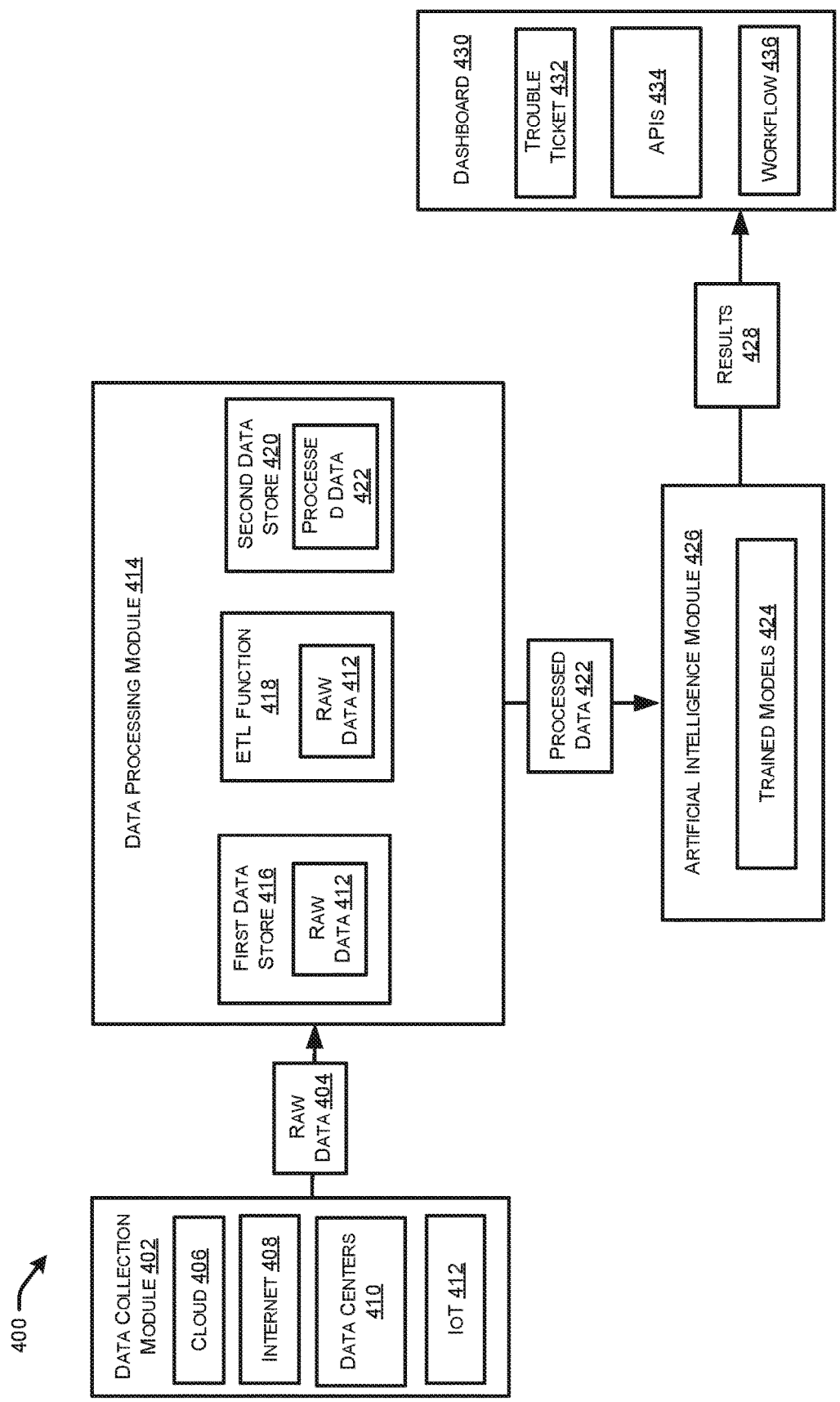
FIG. 4 schematically illustrates an example of an architectural design of a threat detection monitoring system for use in the example environment of FIG. 1.

FIG. 4 schematically illustrates an example of an architectural design of a threat detection monitoring system 400, e.g., threat detection monitoring system 120, that performs threat detection using trained deep learning/machine learning (ML) models, e.g., models 124. As may be seen, a data collection module 402 may gather raw data 404 related to various systems, e.g., system 112, that are being monitored. The data collection module 402 may collect data from the service provider network, e.g., the cloud 406, related to systems executing in and/or accessing services provided by the service provider network. Additionally, if appropriate permissions are granted by users 108, the data collection module 402 may also gather data from the network that couples user devices to the service provider network, e.g., the Internet 408, data centers 410 that are external to the service provider network, internet of things (IoT) devices 412 that are in communication with user devices, the user devices themselves, etc.

The collected raw data 404 may be provided to a processing module 414. The processing module 414 may include a first data store 416 for storing the collected raw data 404 in the raw data format. In configurations, an extract, transform, load (ETL) function 418 may then be performed on the raw data 404. The ETL function 418 processes logs and identifies each log from the originating data source for normalization of the logs. A second data store 420 may be provided for storing the processed data 422 from the ETL function module 418.

The processed data 422 may then be provided to trained models 424, e.g., an artificial intelligence module 426, that utilizes the trained models 424. The models 424 are deep learning models/machine learning (ML) models that have been trained as previously described herein to identify indicators, e.g., patterns and/or effects in monitored and collected data, of particular attacks and specific techniques for instituting the particular attacks.

The artificial intelligence module 426 may provide results 428 from the trained models 424 directly to a user, e.g., user 108, or may be provided to a dashboard 430 for access by the user. Available integration options for the dashboard 430 include a trouble ticket 432 indicating a potential attack, APIs 434 for access to potential fixes and/or further information gathering, a workflow 436 for addressing the detected threat, an alert, etc. In configurations, a trouble ticket and/or alert may be generated and provided to the user and/or a third-party security provider on behalf of the user to address the threat.

Because the data collected by the data collection module 402 collects data from various sources, the raw data 404 may be in various formats, thereby making the raw data difficult to process by the processing module 418. Thus, the ETL function 416 may include an automated log parser (auto-log parser), which is an integrated and standalone tool for transforming free text log messages into structured data. The auto-log parser automatically recognizes the format of the raw data, searches for the field names and their corresponding values in an input log without user input. Thus, the auto-log parser replaces the manual method where every time a new log type is identified, a custom script needs to be written that can parse the new log type. In configurations, the auto-log parser uses artificial intelligence to transform the logs thereby removing the dependency to write custom scripts.

In configurations, the monitoring service 120 and the trained models 124 of FIG. 1 may be used to perform a timeline function that analyzes prior attacks stage-by-stage. Referring to FIG. 5, an example table 500 of results of analyzing historical data using trained models is illustrated. The table 500 provides information relating to a detected severity 502 of elements of a prior attack, a finding type 504, e.g., a type of the elements of the prior attack, an indicator 506 as to the seriousness of the elements of the prior attack, and a time/date 508 at which the elements were last seen.

The security incidents may be plotted on the timeline in the example provided in FIG. 5 based on time last seen 508 (e.g., one hour, 12 hour, daily, weekly, monthly, yearly) and incident type (based on the example chain described with reference to FIG. 2). For example, the incident type may provide what stage of attack this allows for research to be provided by building a timed series of an attack that occurred in the past and how it progressed at each stage.

For example, an attacker tried to scan a customer environment by running reconnaissance steps and then further progressed the attached by exploiting a vulnerability and then installing a backdoor to maintain persistent access and further escalate system-level privileges (e.g., privilege escalation) and move laterally by infecting more components. Finally, the attacker escalated to exfiltrating data out of the network. All these instances and stages may have happened over a period of time such as between six to twelve months. Historical security incidents may now be plotted on a timeline recreating how an attack happened over time with full details of each incident with evidence (log/events) that triggered the detection. Thus, the timeline function may be utilized to help understand attacks and provide valuable information for future training of models. Additionally, the timeline function may help to provide and prove defenses against future attacks.

Figure 6:
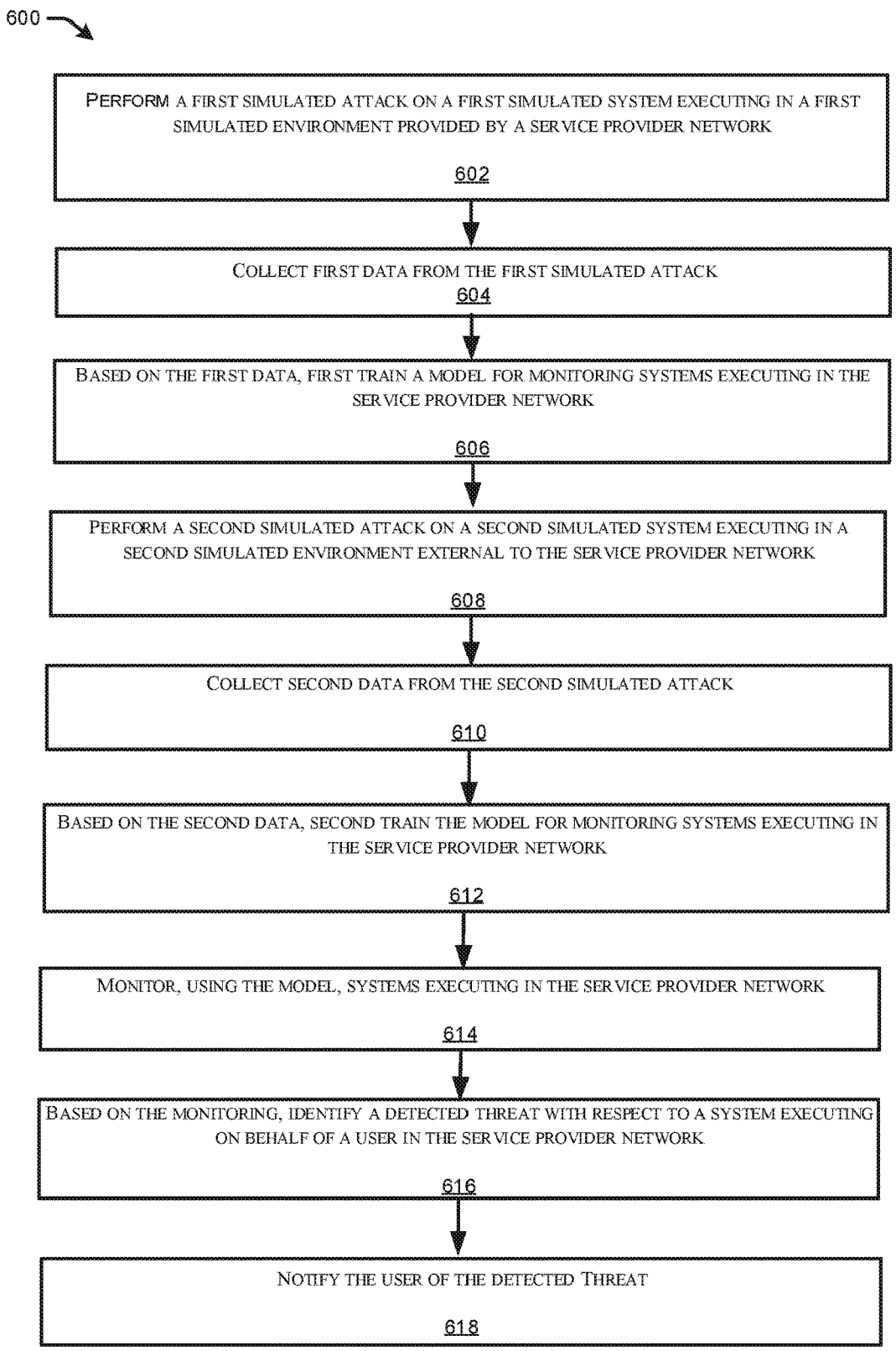
FIG. 6 illustrates a flow diagram of the example method for training models and using the models to for threat detection monitoring of systems executing in the example environment of FIG. 1.

FIG. 6 illustrates a flow diagram of an example method 400 that illustrates aspects of the functions performed at least partly by the service provider network 102 as described in FIGS. 1-5. The logical operations described herein with respect to FIG. 6 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 4, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 6 illustrates a flow diagram of the example method 400 for performing model development and training for use in threat detection monitoring of systems executing in a network, e.g., service provider network 102.

At 602, a first simulated attack is performed on a first simulated system executing in a first simulated environment provided by a service provider network. For example, the first simulated attack may be performed by the model development service 126 on a simulated system executing in the cloud simulator 130 provided by the service provider network 102.

At 604, first data is collected from the first simulated attack. For example, data 128 may be collected by the model development service 126 from the cloud simulator 130.

At 606, based on the first data, first training is performed on a model for monitoring systems executing in the service provider network. For example, the model development service 126 may train the model 124a using the data 128 collected from the cloud simulator 130.

At 608, a second simulated attack may be performed on a second simulated system executing in a second simulated environment external to the service provider network. For example, the second simulated attack may be performed by the model development service 126 on a simulated system executing in the on-premises simulator 132, which is external to the service provider network 102.

At 610, second data is collected from the second simulated attack. For example, data 128 may be collected by the model development service 126 from the on-premises simulator 132.

At 612, based on the second data, second training is performed on the model for monitoring systems executing in the service provider network. For example, the model development service 126 may train the model 124a using the data 128 collected from the on-premises simulator 132.

At 614, systems executing in the service provider network are monitored using the model. For example, the threat detection monitoring service 120 may use the model 124a, which has been trained by the model development service 126 based on the simulated attacks, may monitor one or more systems 112 executing in the service provider network 102.

At 616, based on the monitoring, a detected threat may be identified with respect to a system executing on behalf of a user in the service provider network. For example, the threat detection monitoring service 120 may identify a detected threat based on the model 124a analyzing data 122 and recognizing patterns and/or effects in the data 122. At 618, the user is notified of the detected threat with respect to a system executing on behalf of the user in the service provider network. For example, the user 108 may be notified by the threat detection monitoring service 120 of a detected threat that has been detected by the trained model 124a.

Accordingly, the techniques and architectures described herein allow for threat detection monitoring of systems executing in environments (consisting of hosts, networks, and/or applications, etc.), e.g., service provider networks, using trained deep learning/machine learning (ML) models that form a neural network of trained models to monitor the network for various security threats and associated techniques for instigating the security threats. The models may be trained in one or more stages in simulators within a service provider network, e.g., the cloud, and/or in a simulator located in an on-premises environment, as well as on systems executing within the network. The models may be trained without relying on any security device/feature being configured or enabled, or with such security device/features being configured or enabled.

While the configurations and examples provided herein have been made with reference to a service provider network, it will be appreciated that the techniques and architecture described herein may be used to implement deep learning/machine (ML) model training and development for threat detection monitoring for networks in general, as well as for other scenarios. For example, the techniques and architectures described herein may be used in monitoring for financial fraud in various financial systems. As another example, the techniques and architectures described herein may be used in monitoring and analyzing criminal databases for predicting various aspects of potential criminal activity. Thus, the automated process for using models to detect threats improves the functioning of computing devices, e.g., reduces processing time to monitor and identify security threats, reduces needed manpower in detecting security threats, and more quickly detects and identifies security threats before the security threats become serious. The techniques and architectures may also be used to address online security/fraud issues.

Figure 7:
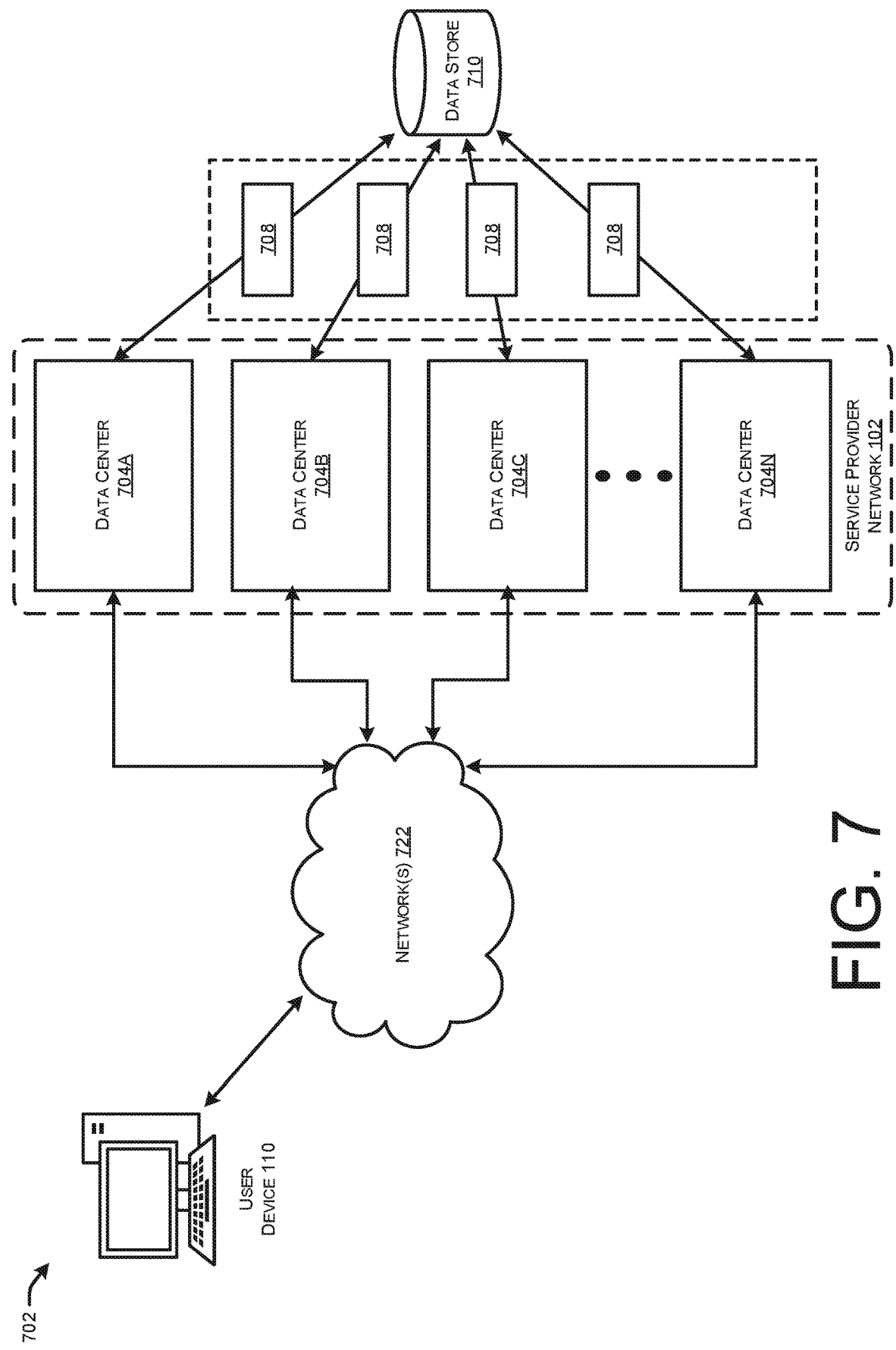
FIG. 7 is a system and network diagram that shows an illustrative operating environment that includes a service provider network that can be configured to implement aspects of the functionality described herein.

FIG. 7 is a system and network diagram that shows one illustrative operating environment 702 for the configurations disclosed herein that includes a service provider network 102 that can be configured to perform the techniques disclosed herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative embodiment for a data center 704 that can be utilized to implement the technologies disclosed herein will be described below with regard to FIG. 8.

The data centers 704 may be configured in different arrangements depending on the service provider network 102. For example, one or more data centers 704 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The customers and other users 108 of the service provider network 102 may access the computing resources provided by the service provider network 102 over any wired and/or wireless network(s) 722, which can be a wide area communication network ("WAN"), such as the Internet, an intranet or an Internet service provider ("ISP") network or a combination of such networks. For example, and without limitation, a user device 110 operated by a customer or other user 108 of the cloud-based service provider network 102 may be utilized to access the service provider network 102 by way of the network(s) 722. It should be appreciated that a local-area network ("LAN"), the Internet, or any other networking topology known in the art that connects the data centers 704 to remote customers and other users can be utilized. It should also be appreciated that combinations of such networks can also be utilized.

As shown in FIG. 7, each of the data centers 704 may include computing devices that included software, such as applications that receive and transmit data 114 and results 118. For instance, the computing devices included in the data centers 704 may include software components which transmit, retrieve, receive, or otherwise provide or obtain the data 114 and/or results 118 from the data store 116. For example, the data centers 704 may include or store the data store 116, which may include the data 114 and/or the results 118. In configurations, the data centers 704 may include or store data 128 and/or data 122.

Figure 8:
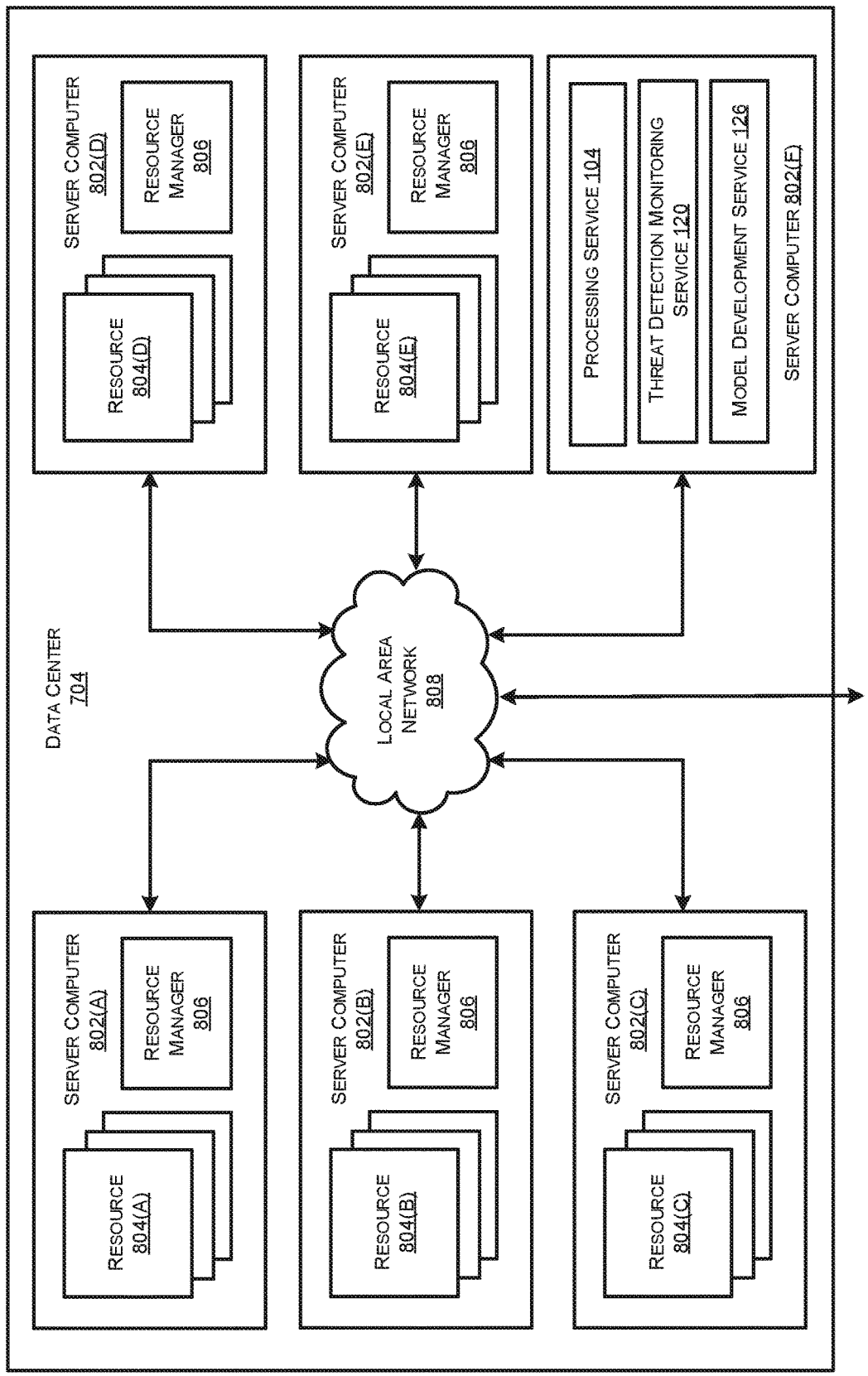
FIG. 8 is a computing system diagram illustrating a configuration for a data center that can be utilized to implement aspects of the technologies disclosed herein.

FIG. 8 is a computing system diagram that illustrates one configuration for a data center 704 that implements aspects of the technologies disclosed herein. The example data center 704 shown in FIG. 8 includes several server computers 802A-802F (which might be referred to herein singularly as "a server computer 802" or in the plural as "the server computers 802") for providing computing resources 804A-804E.

The server computers 802 can be standard tower, rackmount, or blade server computers configured appropriately for providing the computing resources described herein (illustrated in FIG. 8 as the computing resources 804A-804E). As mentioned above, the computing resources provided by the service provider network 102 can be data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 704 can also be configured to provide network services and other types of services, some of which are described in detail below with regard to FIG. 9.

The data center 704 shown in FIG. 8 also includes a server computer 802F that can execute some or all of the software components described above. For example, and without limitation, the server computer 802F can be configured to execute components of the service provider network 102, including the processing service 104, the threat detection monitoring service 120, the model development service 126, and/or the other software components described above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 704 in various embodiments.

In the example data center 704 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the server computers 802. It should be appreciated that the configuration of the data center 704 described with reference to FIG. 8 is merely illustrative and that other implementations can be utilized.

Figure 9:
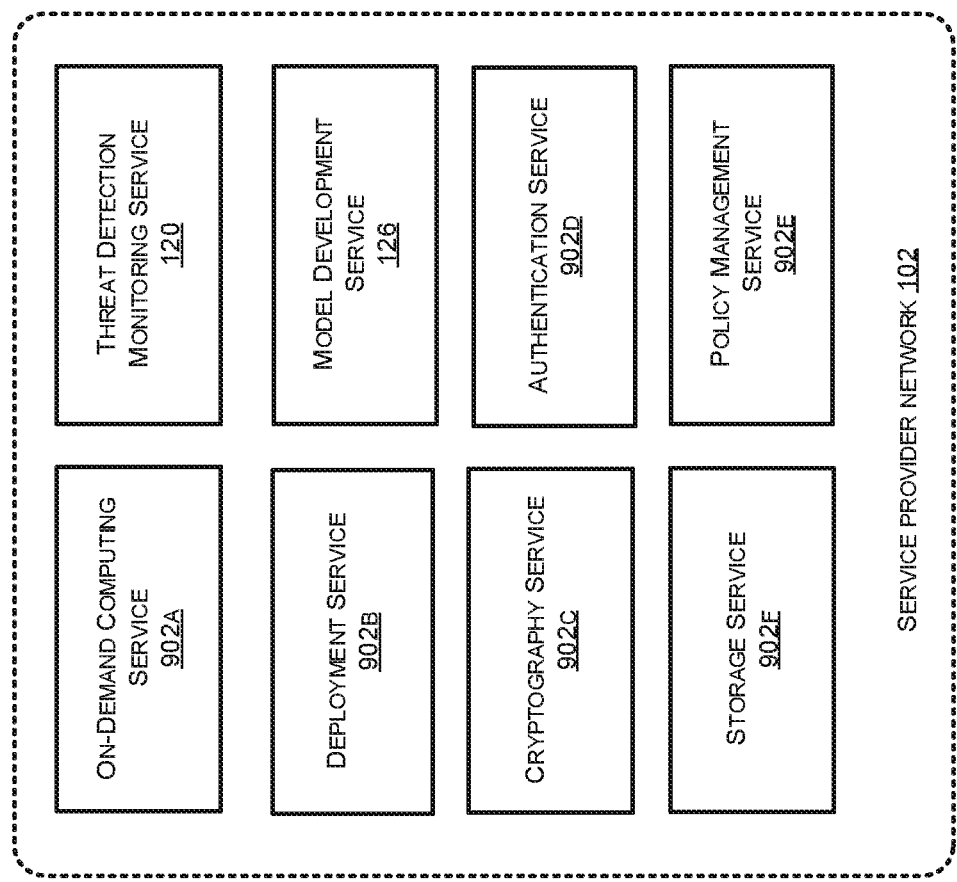
FIG. 9 is a network services diagram that shows aspects of several services that can be provided by and utilized within a system, or a larger system of which the system is a part, which is configured to implement the various technologies disclosed herein.

FIG. 9 is a system and network diagram that shows aspects of several network services that can be provided by and utilized within a service provider network 102 in one embodiment disclosed herein. In particular, and as discussed above, the service provider network 102 can provide a variety of network services to customers and other users of the service provider network 102 including, but not limited to, the threat detection monitoring service 120 and the model development service 132. The service provider network 102 can also provide other types of services including, but not limited to, an on-demand computing service 902A (e.g., processing service 104), a deployment service 902B, a cryptography service 902C, an authentication service 902D, a policy management service 902E, and/or a storage service 902F (e.g., storage service 106), some of which are described in greater detail below. Additionally, the service-provider network 102 can also provide other services, some of which are also described in greater detail below.

It should be appreciated that customers of the service provider network 102 can include organizations or individuals that utilize some or all of the services provided by the service provider network 102. As described herein, a customer or other user can communicate with the service provider network 102 through a network, such as the network 722 shown in FIG. 7. Communications from a customer computing device, such as the user device 110 shown in FIG. 7, to the service provider network 102 can cause the services provided by the service provider network 102 to operate in accordance with the described configurations or variations thereof.

It is noted that not all embodiments described include the services described with reference to FIG. 9 and that additional services can be provided in addition to or as an alternative to services explicitly described. Each of the services shown in FIG. 9 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 902A to store data in or retrieve data from a storage service 9020. Additional details regarding some of the services shown in FIG. 9 will now be provided.

As discussed above, the on-demand computing service 902A (e.g., the processing service 104) can be a collection of computing resources configured to instantiate VM instances and to provide other types of computing resources on demand. For example, a customer or other user of the service provider network 102 can interact with the on-demand computing service 902A (via appropriately configured and authenticated network services API calls) to provision and operate VM instances that are instantiated on physical computing devices hosted and operated by the service provider network 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 902A is shown in FIG. 9, any other computer system or computer system service can be utilized in the service provider network 102, such as a computer system or computer system service that does not employ virtualization and instead provisions computing resources on dedicated or shared computers/servers and/or other physical devices.

A storage service 902F (e.g., storage service 106) can include software and computing resources that collectively operate to store data using block or file-level storage devices (and/or virtualizations thereof) into data store 116, which may be part of the storage service 902F. The storage devices of the storage service 902F, e.g., storage service 106, can, for instance, be operationally attached to virtual computer systems provided by the on-demand computing service 902A to serve as logical units (e.g., virtual drives) for the computer systems. A storage device can also enable the persistent storage of data used/generated by a corresponding virtual computer system where the virtual computer system service might only provide ephemeral data storage.

The service provider network 102 can also include a cryptography service 902C. The cryptography service 902C can utilize storage services of the service provider network 102, such as the storage service 902F, to store encryption keys in encrypted form, whereby the keys are usable to decrypt customer keys accessible only to particular devices of the cryptography service 902C. The cryptography service 902C can also provide other types of functionality not specifically mentioned herein.

As illustrated in FIG. 9, the service provider network 102, in various embodiments, also includes an authentication service 902D and a policy management service 902E. The authentication service 902D, in one example, is a computer system (i.e., collection of computing resources) configured to perform operations involved in authentication of users. For instance, one of the services 902 shown in FIG. 9 can provide information from a user to the authentication service 902D to receive information in return that indicates whether or not the requests submitted by the user are authentic.

The policy management service 902E, in one example, is a network service configured to manage policies on behalf of customers or internal users of the service provider network 102. The policy management service 902E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services 902 based, at least in part, on the needs of its customers. For instance, the service provider network 102 can maintain a deployment service 902B for deploying program code and/or a data warehouse service in some embodiments. Other services include object-level archival data storage services, database services, and services that manage, monitor, interact with, or support other services. The service provider network 102 can also be configured with other services not specifically mentioned herein in other embodiments. The service provider network 102 can additionally maintain and provide services described herein, such as the threat detection monitoring service 120 and the model development service. Functionality of these components are described above, and throughout.

Figure 10:
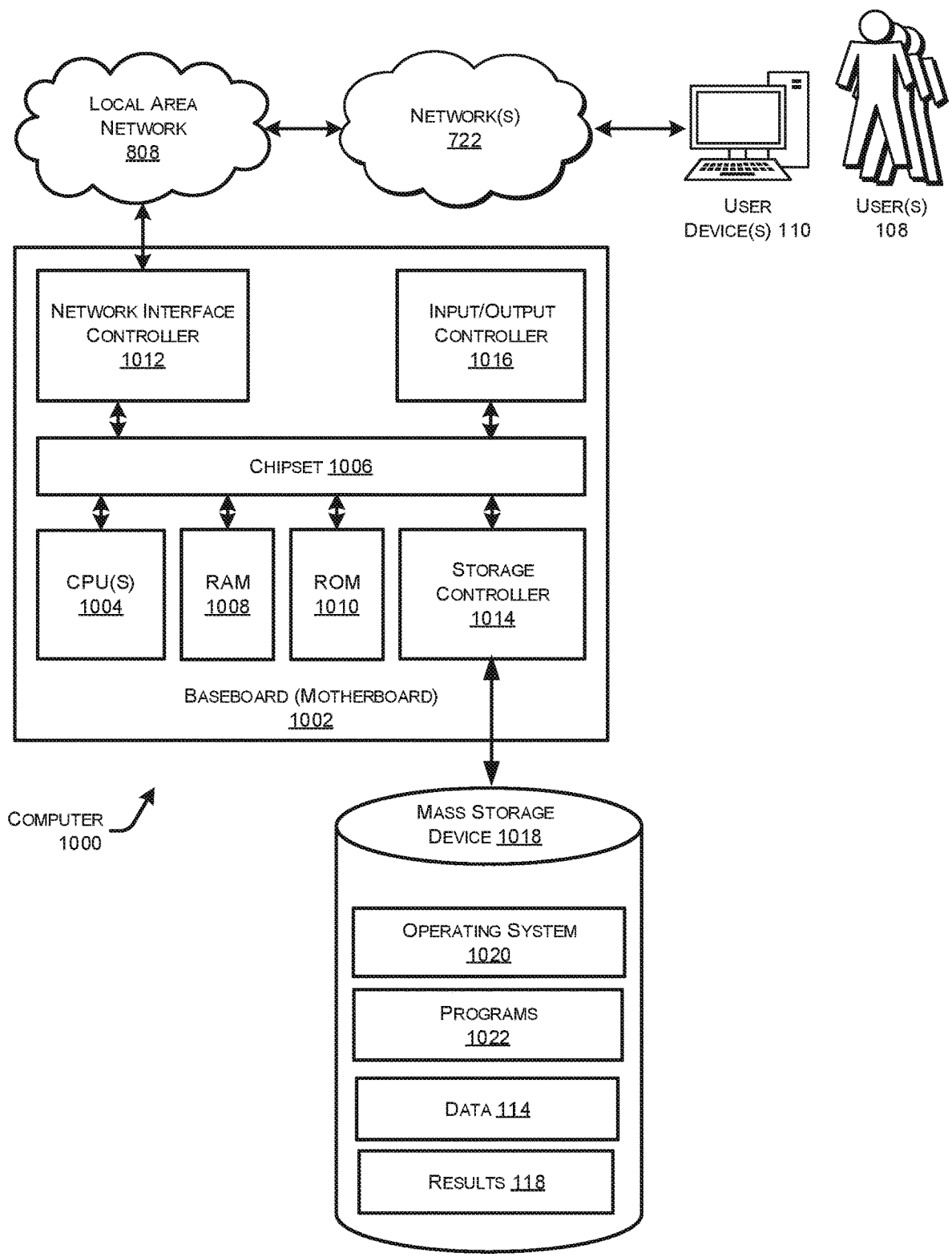
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1008. The chipset 1006 can include functionality for providing network connectivity through a Network Interface Controller (NIC) 1012, such as a gigabit Ethernet adapter. The NIC 1012 is capable of connecting the computer 1000 to other computing devices over the network 1008 (or 722). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022 (e.g., agents, etc.), data, applications(s), data 114, and/or results 118, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 102, and or any components included therein, may be supported by one or more devices similar to computer 1000. Stated otherwise, some or all of the operations performed by the service provider network 102, and or any components included therein, may be performed by one or more computer devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-6. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

As shown in FIG. 10, the computer 1000 may transmit, receive, retrieve, or otherwise provide and/or obtain data 114 and/or results 118 to and/or from the service provider network 102. The computer 1000 may store the data 114 on the operating system 1020, and/or the programs 1022 that are stored in the storage device 1018 to update or otherwise modify the operating system 1020 and/or the programs 1022.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
based on a first simulated attack on a first simulated system executing within a first simulated environment hosted by a service provider network, collecting, by a model development service, first data comprising one or more first host logs/events, one or more first net flows, and one or more first domain name system (DNS) logs from the first simulated attack;
based on the first data, first training, by the model development service, a model for monitoring systems executing in the service provider network;
based on a second simulated attack on a second simulated system executing within a second simulated environment that is external to the service provider network, that is different than the first simulated environment, and that includes hardware computing components that simulate the first simulated system, collecting, by the model development service, second data comprising one or more second host logs/events, one or more second net flows, and one or more second DNS logs from the second simulated attack, the first simulated environment and the second simulated environment both being separate from an actual environment executed within the service provider network;
based on the second data, second training, by the model development service, the model for monitoring the systems executing in the service provider network;
monitoring, by a threat detection service of the service provider network using the model, the systems executing in the service provider network;
based on the monitoring and the model, identifying a detected threat with respect to a system executing on behalf of a user in the service provider network;
determining a confidence level of the detected threat indicating a likelihood that the detected threat is an actual threat to the service provider network; and
notifying, by the threat detection service and based on the confidence level of the detected threat, the user of the detected threat.

2. The method of claim 1, further comprising, prior to monitoring the systems executing in the service provider network:
based on a third simulated attack on one or more systems executing in the service provider network, collecting, by the model development service, third data from the third simulated attack; and
based on the third data, third training, by the model development service, the model for monitoring the systems executing in the service provider network.

3. The method of claim 1, wherein the second simulated attack comprises performing the second simulated attack without security controls being implemented on the second simulated system for at least a predetermined amount of time.

4. The method of claim 1, wherein the second simulated attack comprises performing the second simulated attack with security controls being implemented on the second simulated system for at least a predetermined amount of time.

5. The method of claim 1, further comprising:
analyzing, using the model, historical data related to a system executed in the service provider network, the historical data related to a prior attack on the system executed in the service provider network; and
providing a timeline of the prior attack on the system executed in the service provider network, the timeline comprising a detected severity of elements of the prior attack, a finding type for the elements of the prior attack, an indicator as to a seriousness of the elements of the prior attack, and a time at which the elements were last seen.

6. A method comprising:
based at least in part on a first simulated attack on a first simulated system executing in a first simulated environment within a network, collecting first data from the first simulated attack;
based at least in part on the first data, first training a model for monitoring one or more systems executing in the network;
based at least in part on a second simulated attack on a second simulated system executing in a second simulated environment that is different than the first simulated environment, that is external to the network, and that includes one or more hardware computing components that simulate the first simulated system, collecting second data from the second simulated attack;
based at least in part on the second data, second training the model for monitoring the one or more systems executing in the network;
monitoring, using the model, the one or more systems executing in the network;
determining, based at least in part on the monitoring and using the model, a detected threat with respect to a system executing on behalf of a user in the network;
determining a confidence level of the detected threat indicating a likelihood that the detected threat is an actual threat to the network; and
performing an action with respect to the detected threat based at least in part on the confidence level of the detected threat.

7. The method of claim 6, wherein the second simulated attack comprises performing the second simulated attack without security controls being implemented on the second simulated system for at least a predetermined amount of time.

8. The method of claim 6, wherein the second simulated attack comprises performing the second simulated attack with security controls being implemented on the second simulated system for at least a predetermined amount of time.

9. The method of claim 6, further comprising:
analyzing, using the model, historical data related to the system executed in the network, the historical data related to a prior attack on the system executed in the network; and
providing a timeline of the prior attack on the system executed in the network, the timeline comprising a detected severity of elements of the prior attack, a finding type for the elements of the prior attack, an indicator as to a seriousness of the elements of the prior attack, and a time at which the elements were last seen.

10. The method of claim 6, further comprising:
based at least in part on the monitoring, notifying a third-party security provider of the detected threat with respect to the system executing on behalf of the user in the network.

11. The method of claim 6, wherein the first simulated attack comprises performing the first simulated attack without simulated user traffic visiting the first simulated system, wherein the second simulated attack comprises including simulated user traffic visiting the second simulated system, and further comprising, prior to monitoring the one or more systems executing in the network:
based at least in part on a third simulated attack on the one or more systems executing in the network, collecting third data from the third simulated attack; and
based at least in part on the third data, third training the model for monitoring the one or more systems executing in the network.

12. The method of claim 6, wherein the second simulated attack comprises performing the second simulated attack without security controls being implemented on the second simulated system for a first period of time and performing the second simulated attack with the security controls being implemented on the second simulated system for a second period of time.

13. The method of claim 1, wherein the model development service maintains multiple trained models, wherein each model of the multiple trained models is trained to identify a particular type of threat and a specific technique for instigating the particular type of threat.

14. The method of claim 13, wherein the multiple trained models communicate with one another thereby forming a neural network of trained models for monitoring the service provider network for security threats and identifying techniques for instigating the security threats.

15. The method of claim 1, wherein the second simulated system is implemented within a cyber range that comprises an on-premises collection of computing and networking hardware, and computing and networking software.

16. One or more computer-readable media storing computer-executable instructions that, when executed, cause one or more processors to perform operations comprising:
based at least in part on a first simulated attack on a first simulated system executing in a first simulated environment within a network, collecting first data from the first simulated attack;
based at least in part on the first data, first training a model for monitoring one or more systems executing in the network;
performing a second simulated attack on a second simulated system executing in a second simulated environment that is different than the first simulated system and that is external to the network;
based at least in part on the second simulated attack on the second simulated system executing in the second simulated environment that is different than the first simulated environment, that is external to the network, and that includes one or more hardware computing components that simulate the first simulated system, collecting second data from the second simulated attack;
based at least in part on the second data, second training the model for monitoring the one or more systems executing in the network;
monitoring, using the model, the one or more systems executing in the network;
determining, based at least in part on the monitoring and using the model, a detected threat with respect to a system executing on behalf of a user in the network;
determining a confidence level of the detected threat indicating a likelihood that the detected threat is an actual threat to the network; and
performing an action with respect to the detected threat based at least in part on the confidence level of the detected threat.

17. The one or more computer-readable media of claim 16, wherein the first simulated attack comprises performing the first simulated attack without simulated user traffic on the first simulated system for at least a predetermined amount of time, and wherein the second simulated attack comprises including simulated user traffic on the second simulated system for at least a predetermined amount of time.

18. The one or more computer-readable media of claim 16, wherein the operations further comprise:
based at least in part on a third simulated attack on the one or more systems executing in the network, collecting third data from the third simulated attack; and
based at least in part on the third data, third training the model for monitoring the one or more systems executing in the network.

19. The one or more computer-readable media of claim 18, wherein the operations further comprise:
analyzing, using the model, historical data related to a system executed in the network, the historical data related to an attack on the system executed in the network; and
providing a timeline of the attack on the system executed in the network, the timeline comprising a detected severity of elements of the attack, a finding type for the elements of the attack, an indicator as to a seriousness of the elements of the attack, and a time at which the elements were last seen.

20. The one or more computer-readable media of claim 16, wherein the operations further comprise:
based at least in part on the monitoring, notifying a third-party security provider of the detected threat with respect to the system executing on behalf of the user in the network.

* * * * *